United States Patent [19]
Dojan

[11] Patent Number: 5,635,680
[45] Date of Patent: Jun. 3, 1997

[54] ON BOARD WEIGHING SYSTEM FOR WEIGHING THE LOAD BORNE BY A VEHICLE

[75] Inventor: Harold D. Dojan, Luck, Wis.

[73] Assignee: Rice Lake Bearing, Inc., Rice Lake, Wis.

[21] Appl. No.: 194,886

[22] Filed: Feb. 14, 1994

[51] Int. Cl.$^6$ .................................................. G01G 19/08
[52] U.S. Cl. .......................................................... 177/136
[58] Field of Search ...................... 177/136, 137, 177/138

[56] References Cited

U.S. PATENT DOCUMENTS

| | | | |
|---|---|---|---|
| 3,565,288 | 2/1971 | Shute | 177/120 |
| 3,580,343 | 5/1971 | Hogue et al. | 177/136 |
| 5,369,222 | 11/1994 | Strelioff | 177/136 |
| 5,393,936 | 2/1995 | Tyhy et al. | 177/138 |

*Primary Examiner*—Michael L. Gellner
*Assistant Examiner*—Randy W. Gibson
*Attorney, Agent, or Firm*—Patterson & Keough, P.A.

[57] ABSTRACT

In a onboard weighing system for a vehicle the load is carried by a load frame which during the transport mode rests on the vehicle support frame and for weighing, after the vehicle has come to a stop, a force is applied to raise the load frame off the vehicle support frame and onto a load cell so that the load cell will produce a signal indication of the weight of the load. As a feature the load cell is pivotally mounted in gimbal rings to compensate for any pitch or roll angles due to tilting of the vehicle and/or the load frame. As yet another feature a mechanism is provided to securely but releasably lock the load or weigh frame onto the vehicle support frame during the transport mode.

14 Claims, 7 Drawing Sheets

ON BOARD WEIGHING SYSTEM FOR WEIGHING THE LOAD BORNE BY A VEHICLE

FIELD OF THE INVENTION

An onboard vehicle weighing system is used to weigh a load carried by a vehicle with the system being wholly contained within the vehicle. Typically while the load is being moved, i.e., during the transport mode, the load rests on the vehicle frame. For weighing the load while the vehicle is stopped, a load cell or similar load-sensing device is provided and the load is coupled in some fashion to the load cell so that the load cell will produce a signal indication of the weight of the load. The system is used not only for measuring the weight of a load as it is being placed on a vehicle, it is also used, possibly even more importantly, to weigh portions of a load being removed from a vehicle. Typically this occurs where a vehicle, sometimes referred to as a "mother" truck or tank, is used to transport a load of material to various locations and at each of the locations some of the load is removed. The amount removed is measured by using the onboard weighing system.

DESCRIPTION OF THE PRIOR ART

There have been onboard weighing systems in which the load cell or other load-sensing device is always attached between the load and the vehicle support frame even during the transport mode. While these type of systems give a fairly accurate measurement of the load, they do not have the accuracy that is ordinarily required in order to qualify for what is known as "legal for trade". This is normally due to the fact that the load cells or weighing devices must be made rugged enough to withstand the forces encountered during the transport mode which can be quite large due to the bumping and bouncing of the vehicle so they do not have the required accuracy.

In a more recent onboard weighing system the load cells or other weight-sensing devices are permanently attached to the vehicle but they are disengaged from the load frame or load during the transport mode. For measuring the load, the vehicle is brought to a stop and the load or load frame is lifted off the vehicle support frame and then hooked onto the load cell for weighing. In this type of system hydraulic jacks are used to lift the load or weigh frame off the vehicle support frame and then links are placed between the load or weigh frame and the load cells and then the hydraulic jacks are released to lower the weigh frame until it is fully resting on the links and supported by the load cells. Afterwards the hydraulic jacks raise the weigh frame off the links and the links are removed and then the weigh frame is brought to rest back on the support frame of the vehicle for transport. This type of system requires some manual intervention by requiring the placing of the link members in the proper locations and then removing the link members after the weighing is done and the machine convened back to the transport mode. Also, in order to compensate for inaccuracies of pitch and roll due to the tilting of the vehicle frame as well as the load or weigh frame, this latter system requires sophisticated electronic circuitry, referred to as a clinometer, to provide a signal indication of the angular orientation of the support frame. Not only is this a costly device but it has been found that it has to be calibrated periodically. Also, the readings by the clinometer generally are affected by ambient conditions, namely, temperature. The readings are likely to differ considerably when used in northern climes during the winter time as versus southern areas during the summer time.

SUMMARY OF THE INVENTION

The present invention provides an on-board weighing system in which the load cell (or other weight sensing device) is always in place yet does not carry the load during the transport mode. Only after the vehicle is brought to a halt and the weighing system activated does the load cell bear the weight of the load. During the transport mode the load or weigh frame rests securely on the vehicle support frame. One end of the load cell is permanently pivotally attached to the vehicle support frame. For weighing, a hydraulic jack operates lever means which raise the weigh or load frame off the vehicle support frame and at the same time applies a force to the other end of the load cell so that the load cell then produces a signal indication of the weight carded by the load frame. There is no requirement for manual intervention in order to attach or link the load frame to the load cells during the weighing mode. Both ends of the load cell are mounted to gimbal rings in a fashion such that pitch and/or roll errors which might otherwise enter into the reading produced by the load cell due to tilting of the vehicle are compensated for so that the load cell gives a very accurate reading, as required for certification as "legal for trade" without the requirement of sophisticated complex electronic instrumentation.

A further feature of a preferred embodiment of the invention provides a springloaded locking mechanism for securely holding the weigh or load frame to the vehicle support frame during the transport mode yet permitting the load frame to be lifted off the vehicle frame during the weighing mode.

Yet another feature is providing a cammed lever arm which will initially provide some additional force to initially separate the load frame from the vehicle frame in the event that the two are somewhat stuck together which can occur when the vehicle is operating in snow and icy or freezing environment. The cam surface acts as a fulcrum to increase the force available to provide a mechanical advantage to achieve an additional force which may be necessary to initially break the load frame away from the vehicle frame.

DESCRIPTION OF THE PREFERRED EMBODIMENTS

Preliminarily it should be pointed out that although the invention will be described as it would be used in conjunction with a flatbed vehicle or truck, that no limitation thereto is intended and that type of a vehicle is only intended for illustrative purposes.

The described preferred embodiment utilizes a hydraulic cylinder or hydraulic jack as the power means. However, it should be understood that this is illustrative and not limitive since other types of cylinders or jacks, such as pneumatic, electric or manually operated jacks or cylinders can be used. Also it should be understood that other types of power devices which are able to perform the same functions of a hydraulic cylinder or jack can be used. In the claims these devices are generically referred to as double-acting linear power devices and, by definition, have a fixed component (e.g., a cylinder) and a movable component (e.g., a piston), or in other words a driving element and a driven element, respectively. For purposes of definition, as used herein, the driven element can be considered as moving from a retracted position, when not driven, to an extended position, when driven.

Also, it should be understood that normally multiple weighing systems of the nature described are utilized on the vehicle and are strategically located with respect to the vehicle frame to provide the true reading of the weight of the load. For example, in the illustration using a flat bed truck, ordinarily four weighing systems located at what would be considered four corners of a rectangular at suitable spacing as determined by the dimensions of the vehicle would be placed on the vehicle and the combined readings of the weight measured by each system at each location would give a reading of the total weight of the load. It should be understood that for other types of vehicles or certain loads it may be possible to use fever or it may be necessary to use more weighing systems in order to get an accurate reading of the weight of the load.

Figure 1:
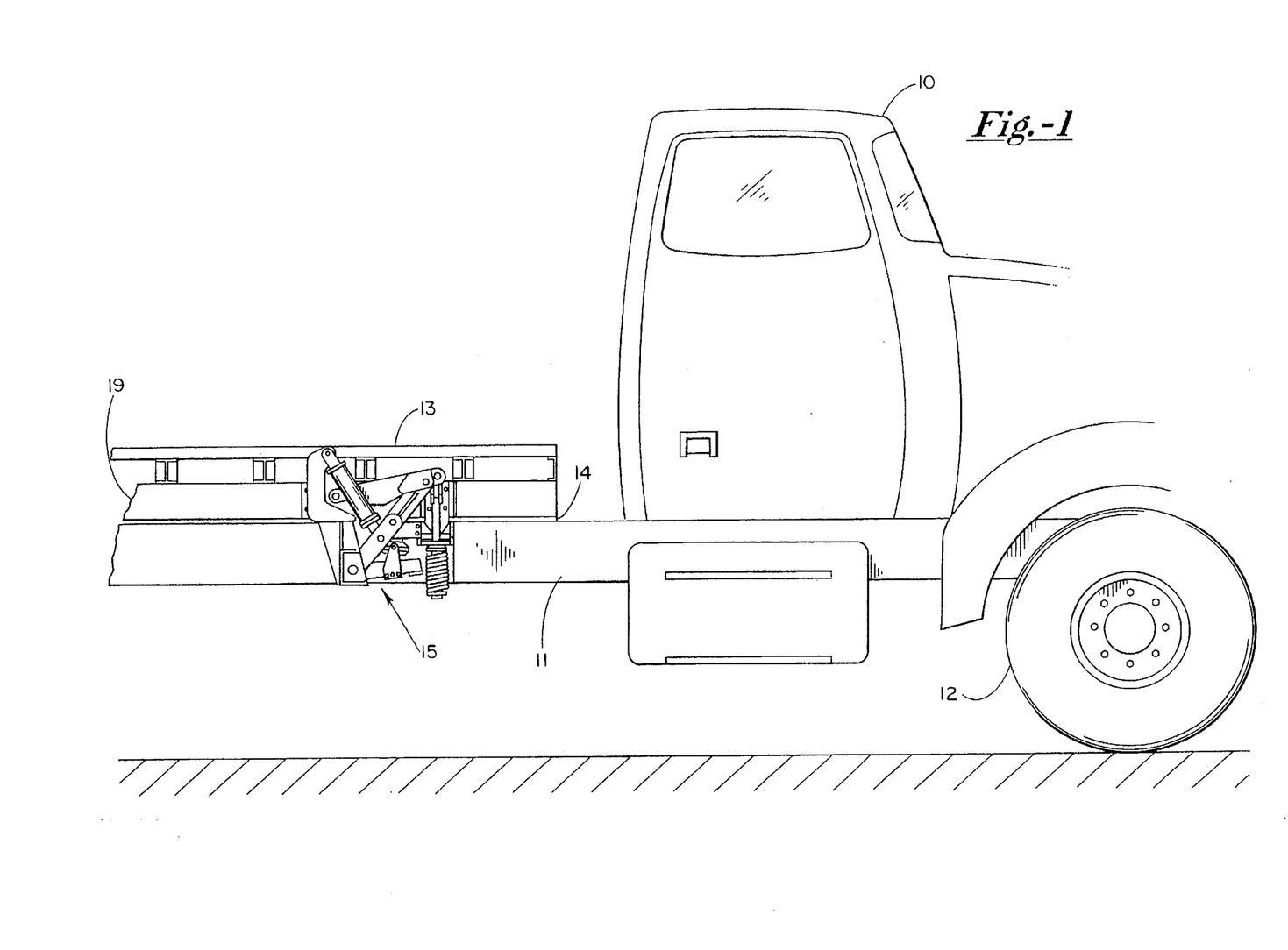
FIG. 1 illustrates the relative placement of a preferred embodiment of the invention with respect to a vehicle.

Typically and for illustrative purposes only, as shown in FIG. 1, a flatbed track conventionally has a cab 10 and a rearward extending generally horizontal vehicle support frame 11 suitably and conventionally mounted on support wheels 12. A generally horizontal rigid load frame or weigh frame 13 rests on top of the vehicle support frame and may be separated therefrom by a spacer 14. A weighing system constructed according to the teachings of this invention and generally designated by reference numeral 15 is suitably mounted between the vehicle support frame 11 and the load or weigh frame 13. The load, not shown, rests on the load frame or weigh frame 13. As mentioned earlier, a number of weighing systems 15 are strategically located on the vehicle in order to produce an accurate overall reading of the weight of the load. Generally speaking, this can be referred to as a network of weighing systems. The following description will apply to a single weighing system 15 but it should be understood that all of the weighing systems are the same and the signal indications of the weights registered at each of the weighing systems are combined in a suitable fashion to produce the end result which is the measurement of the total weight of the load. As mentioned earlier, during the transport mode load frame 13 rests upon spacer 14 which in turn rests on the vehicle support frame 11. Spacer 14 is preferably made of an elastomeric material which separates the weigh frame 13 from the truck or support frame 11 for even load distribution during the transport mode and for reducing noise which otherwise might occur due to the vibrations in transit. Weighing system 15 can be energized only when the vehicle has been brought to a stop. Suitable circuitry and mechanisms provide a safety system to ensure against the weighing system being energized while the vehicle is in motion or on too steep a slope. During the weighing mode the weighing system is energized to elevate or raise load frame 13 from spacer 14 or truck frame 11 to transfer the weight of the load to a suitably located load cell which will then give a reading indicative of the weight of the load being measured by the weighing system. It is important that during the weigh mode that weigh frame 13 makes no contact with track frame 11 (or spacer 14) so that the entire load is supported by the load cell.

Figure 7:
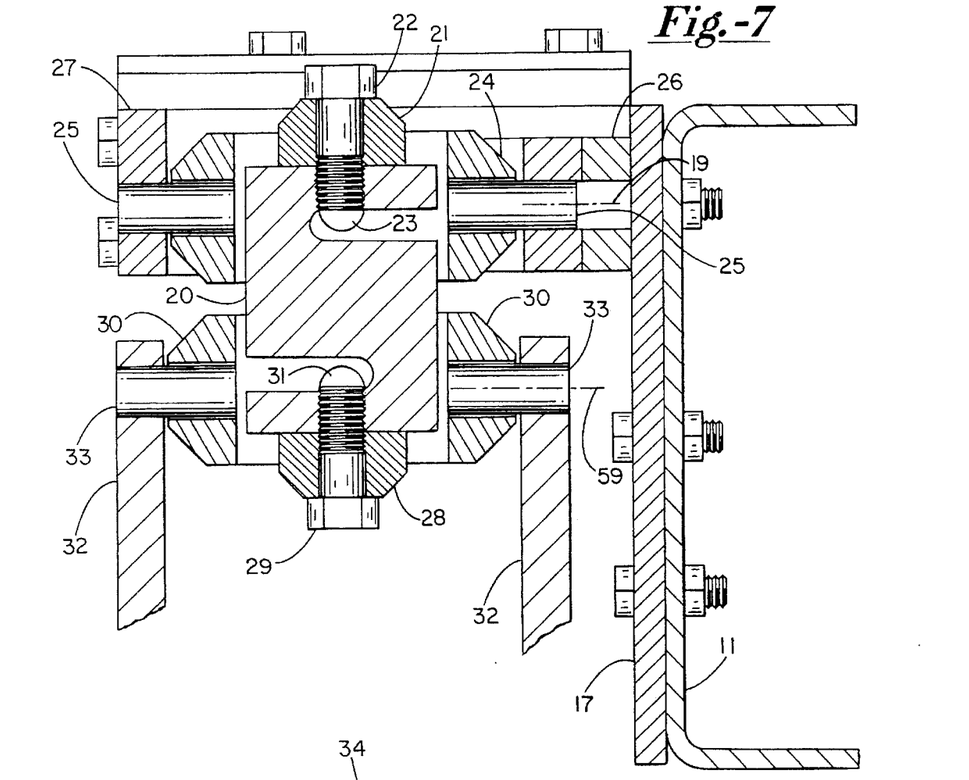
FIG. 7 is a partial section front elevational view illustrating in greater detail the attachment of the load cell in the preferred embodiment of the invention.

As shown most clearly in FIG. 7, the illustrated embodiment of the invention utilizes a generally S-shaped toad cell 20 which, conventionally, produces an electrical signal indication when a force is applied in tension to the opposite ends of the load cell. A U-shaped cap 21 is attached to the top end of load cell 20 by a bolt 22 threaded into the top end of load cell 20 and the outer legs of the U of cap 21 are pivotally attached at 23 to a surrounding upper gimbal ring 24 along an axis designated by reference numeral 18. At ninety degrees from pivot attachment 23 gimbal ring 24 is pivotally attached via pivot pin 25 and ring mounts 26 and 27 along an axis identified by reference numeral 19 to vehicle frame mounting plate 17 which is fixedly attached to vehicle frame 11 by suitable bolts or weldments. This attaches one end of load cell 20 to vehicle frame 11 with the pivot axis 19 making a ninety degree intersection with the gimbal ring pivot axis 18. At its other or lower end, as seen in FIG. 7, load cell 20 is attached to a similar U-shaped cap member 28 by a bolt 29 which is threaded into the lower end of load cell 20. Cap 28 is pivotally attached to lower gimbal ring 30 at 31 along an axis identified by reference numeral 57 and gimbal ring 30 is pivotally attached to a gimbal yoke 32 by pivot pins 33 along an axis identified by reference numeral 59 which makes a ninety degree intersect with axis 57. Yoke 32 is part of weigh arm assembly generally designated by reference numeral 34.

Figure 5:
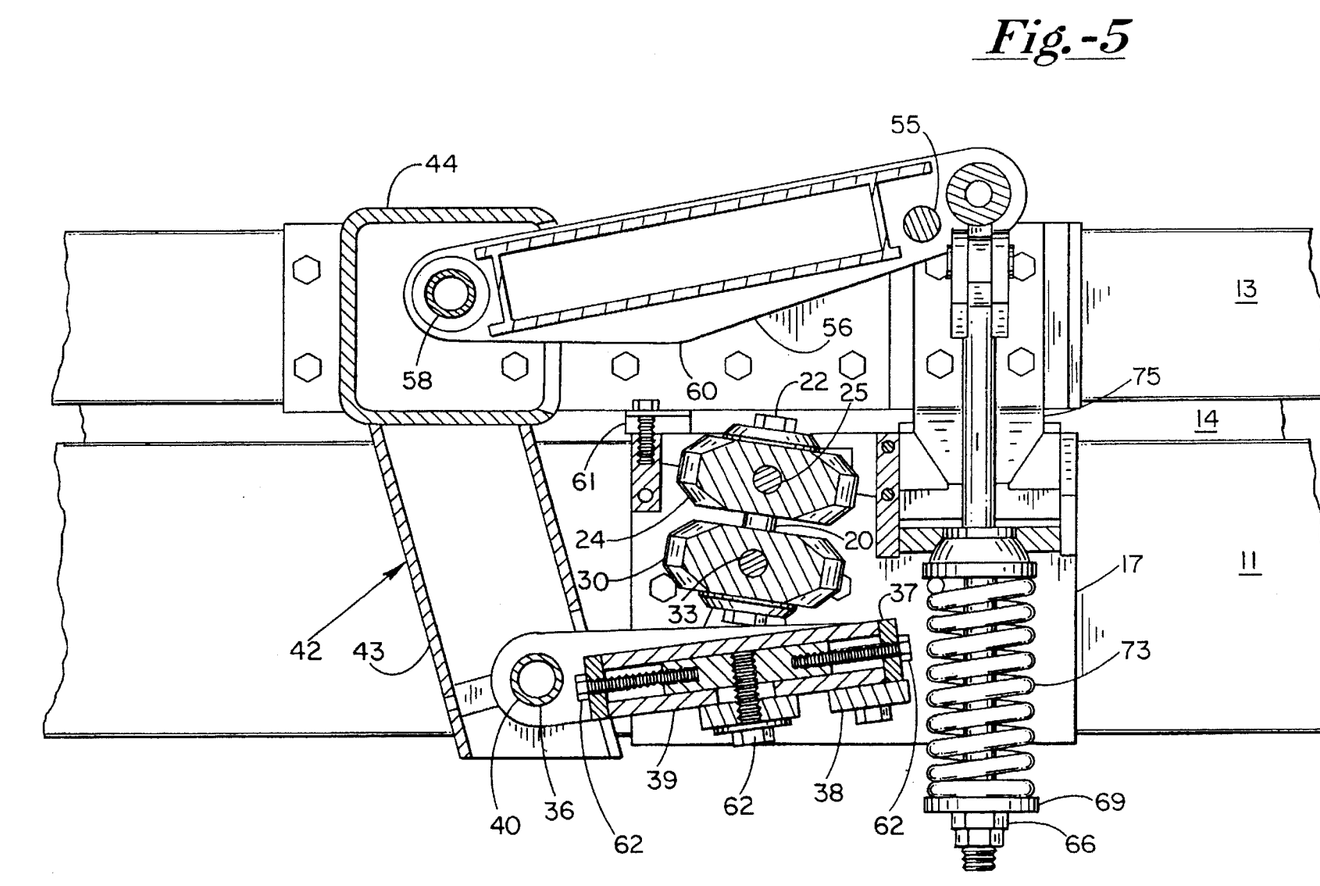
FIG. 5 is a partial section side elevational view illustrating in greater detail the arrangement of the mechanisms in the transport or nonweighing mode.
Figure 8:
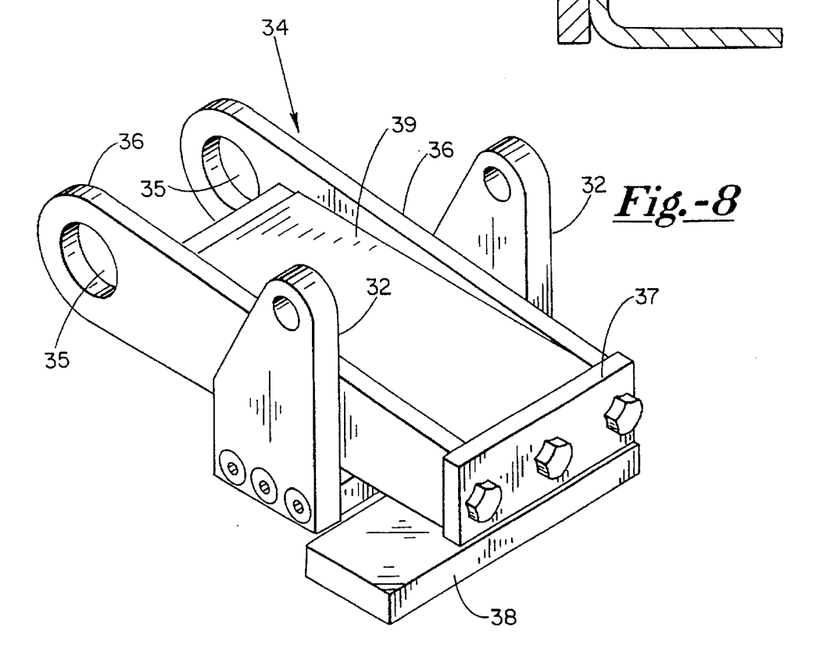
FIG. 8 is an enlarged perspective view of a preferred form of the weigh arm assembly.

Weigh arm assembly 34 (FIG. 8) includes a pair of spaced-apart vertically oriented side members 36, a cross member 37 at one end, a horizontally disposed outward extending lip member 38 and a box-like member 39 located between the two side members 36. As illustrated in FIG. 5, various threaded adjustments identified collectively by reference numeral 62 are provided for weigh arm assembly 34. It has been found that these may be necessary during initial installation of the weighing system in order to compensate for dimensional differences that can result from the wide range of tolerances in the dimensions for the various mechanical parts of the system. These adjustments are used, if necessary, to make sure that when each load cell in each weighing system on a vehicle is "plumb bobbed" that the "plumb bob" lines are all parallel to one another. Usually the adjustments are made by trial and error, going from one weigh system to another (and sometimes back-and-forth) until the "plumb bob" lines are substantially parallel. At its other end weigh arm assembly 34 has openings 35 for engaging horizontally extending common pivot pin or rod 40 to pivotally attach to a cylinder mounting bracket generally identified by reference numeral 42.

Figure 3:
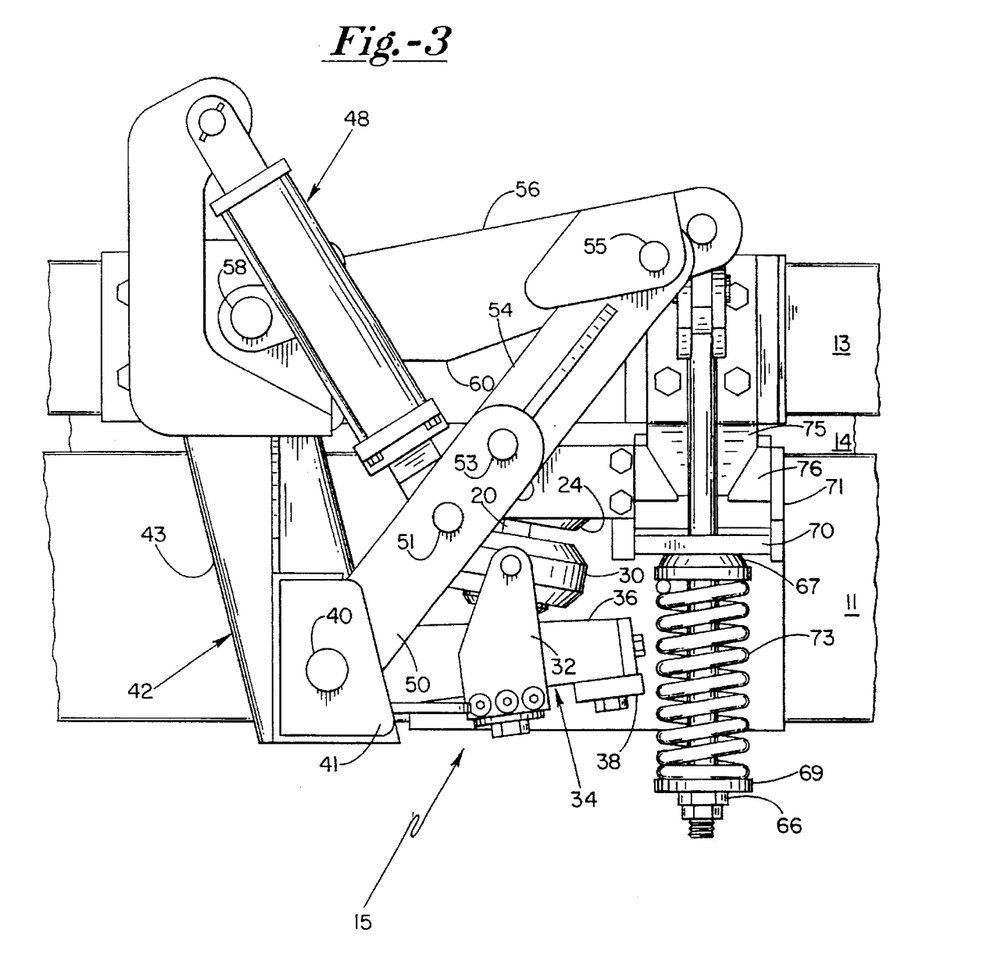
FIG. 3 is a side elevational view of the invention illustrated in FIG. 2.
Figure 4:
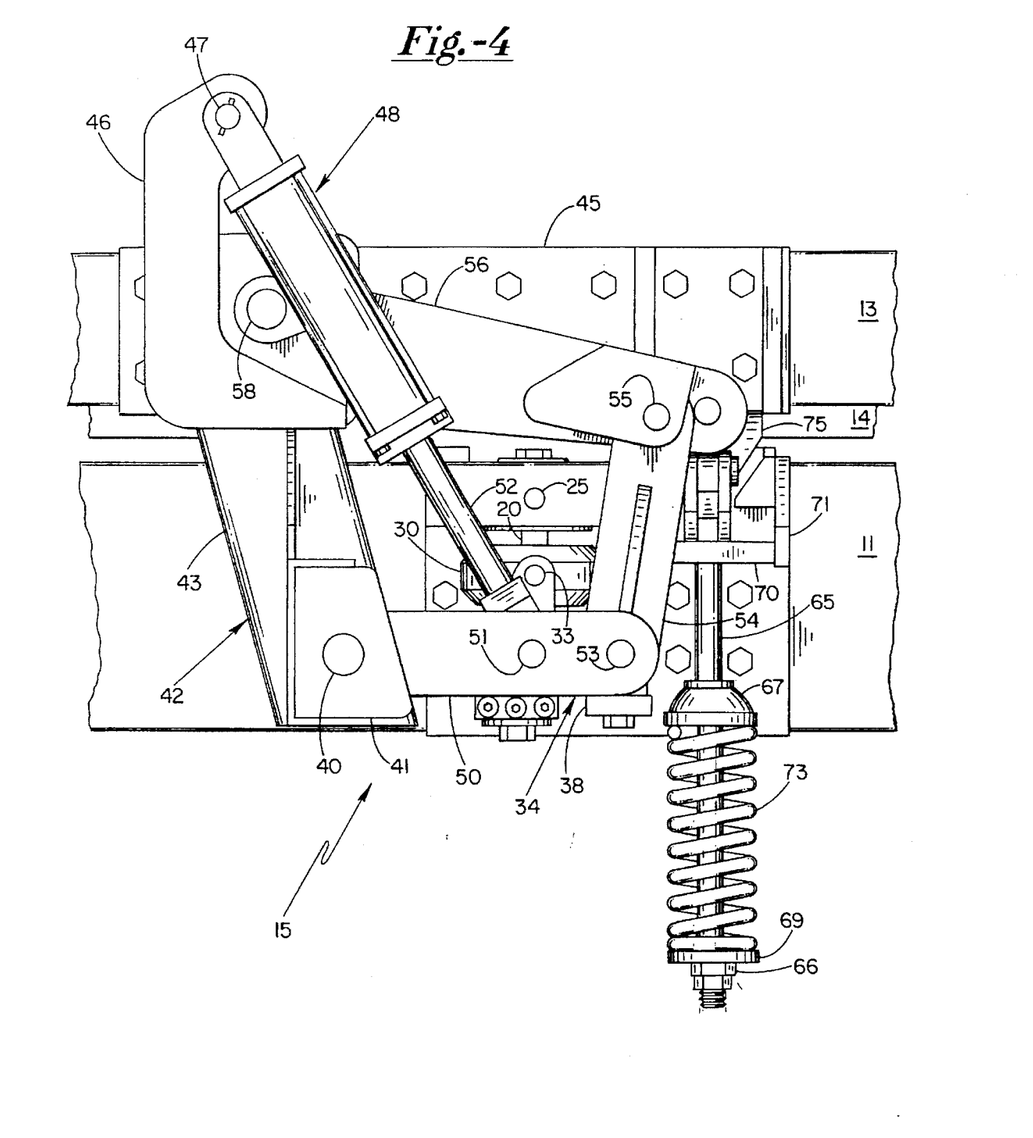
FIG. 4 is a side elevational view of the embodiment illustrated in FIG. 2 as it appears in the weighing mode.

Pivot rod 40 is mounted between side members 41 of bracket 42 and an upwardly sloped back plate 43 of bracket 42 is fixedly attached to a box-like housing 44 which is bolted or otherwise fixedly attached to load frame mounting plate 45 which in mm is fixedly attached by bolts or suitable weldments to the side of weigh frame 13. A generally L-shaped rigid arm 46 is a part of or is fixedly attached to housing 44 and extends upward therefrom. Pivotally attached by a pivot pin 47 to the upper end of arm 46 is the closed end of a hydraulic cylinder or jack generally designated by reference numeral 48. Another lever arm identified by reference numeral 50 and referred to as the cylinder arm is swingably or pivotally mounted at one end to rod or pin 40. Toward its opposite end cylinder arm 50 is pivotally attached by a pin 51 to the end of piston 52 of hydraulic jack or cylinder 48. FIG. 3 illustrates the hydraulic cylinder with the piston fully retracted (transport mode) and FIG. 4 illustrates the piston in the fully extended position (weighing mode). As piston 52 extends and retracts it causes cylinder arm 50 to correspondingly swing downward and upward about rod 40. In the fully extended position as illustrated in FIG. 4, cylinder arm 50 contacts lip 38 of weigh arm assembly 34 applying a force to weigh arm assembly 34. By virtue of yoke 32 being coupled to one end of load cell 20 through gimbal ring 30 and cap 28 this force is applied to the lower end of the load cell. By virtue of the upper end of load cell 20 being attached to vehicle frame 11, in the manner as described previously, the force applied to the lower end of load cell 20 causes the load cell to produce a signal indication of that force. Concurrently, with cylinder arm 50 being stopped by lip member 38 hydraulic jack 48 by virtue of its connection to housing 44 and ultimately to weigh frame 13 lifts or elevates weigh frame 13 off spacer 14 so it is no longer supported by the vehicle frame 11 so that the force that is applied to load cell 20 is the weight of the load as measured by this weighing system.

At its distal end cylinder arm 50 is pivotally attached by pivot pin 53 to link 54 which in turn is pivotally attached by pin 55 to another lever arm 56 which is identified as a lock arm. At one end lock arm 56 is rotatably mounted on a pin or rod 58 which similar to housing 44, is attached to weigh frame mounting plate 45. As observed most clearly in FIGS. 3 and 5, lock arm 56 at its bottom side has an angled or cam surface in the shape of a shallow "V" designated by reference numeral 60.

Figure 2:
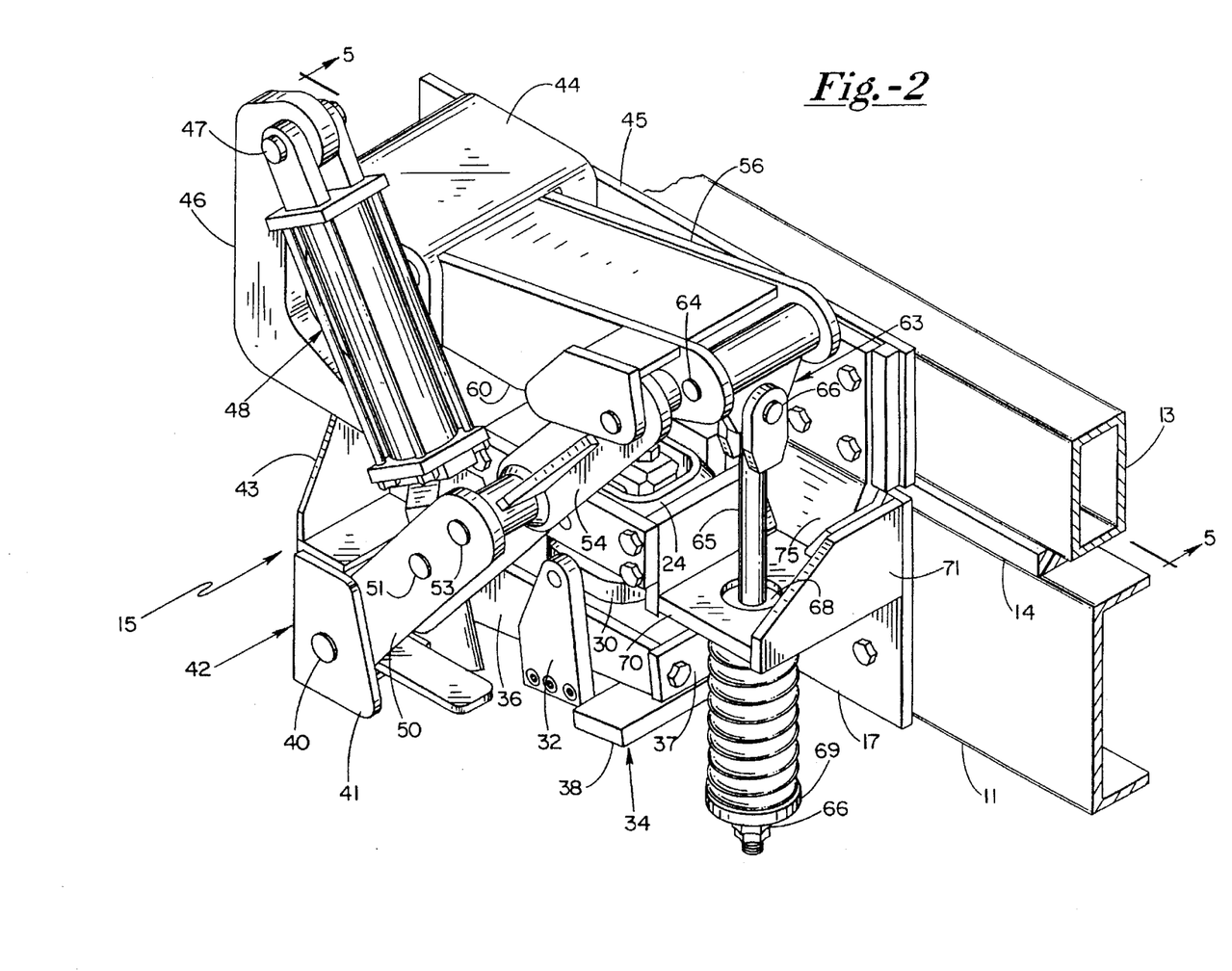
FIG. 2 is a perspective view illustrating the arrangement of the mechanisms of the preferred embodiment of the invention in the transport or nonweighing mode.
Figure 6:
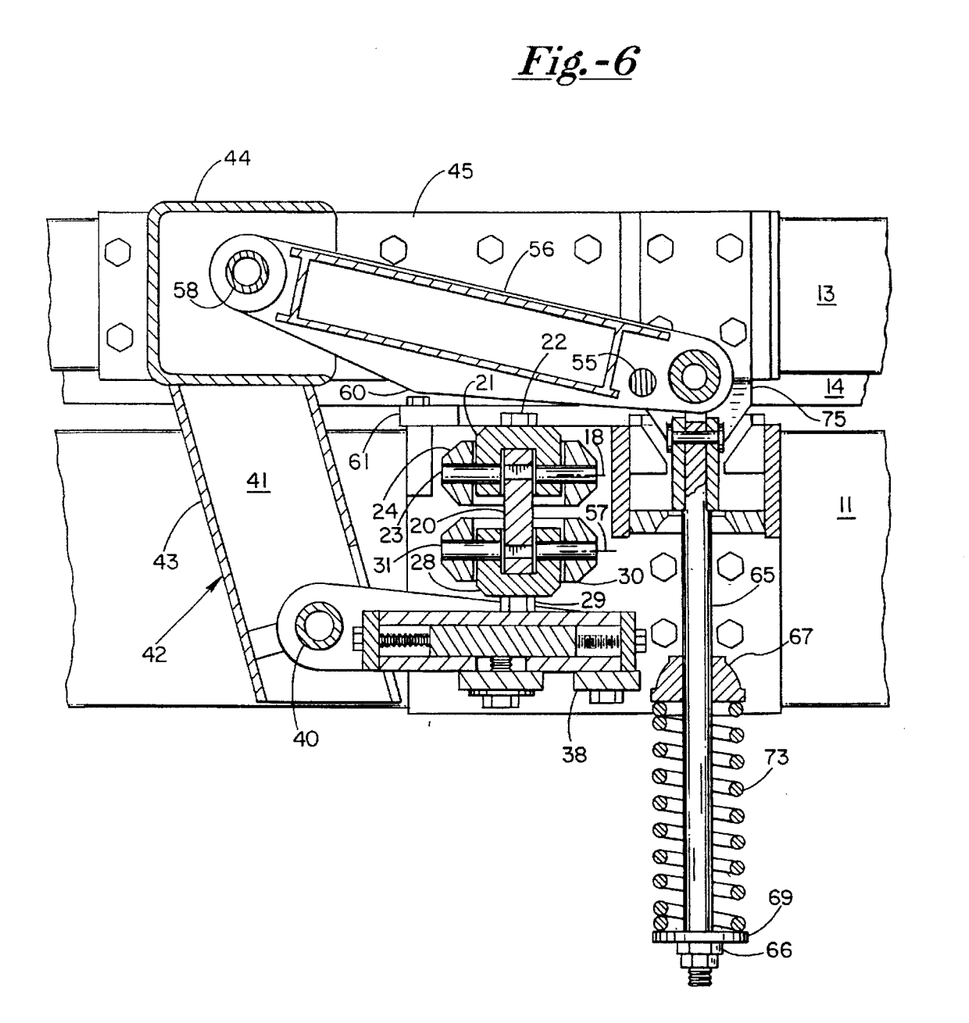
FIG. 6 is a section view similar to FIG. 5 in the weighing mode.

Extending outward at a right angle from vehicle frame mounting plate 17 is a rigid plate 61 (FIG. 6). By virtue of the connection via link 54 the outer end of lock arm 56 correspondingly moves up and down as piston 52 of cylinder assembly 48 retracts and extends as it moves between the transport and weighing modes. When the piston is in the retracted position, as observed in FIGS. 2 and 3, lock arm 56 is elevated so that the cam surface 60 does not contact plate 61. As piston 52 extends, moving toward the weigh mode, the outboard end of lock arm 56 is pulled downward until cam surface 60 strikes plate 61. This applies a force to weigh frame 13 through pin 58 and housing 44 to momentarily raise or elevate weigh frame 13 off spacer 14 (or vehicle frame 11). This momentary lift protects the load cells from the rigors of an initial lifting of the weigh frame 13 from the vehicle frame 11. There can be extended periods of time when the weighing system is not in use, hence the weigh frame with its load can stick to the vehicle frame or the spacer. This is particularly true where there may be freezing conditions and some moisture finds its way and freezes under the weigh frame. The force applied in the fashion described will be enough to cause the weigh frame to break free without applying an undue force to the load cell. Eventually as the hydraulic cylinder piston advances to its fully extended position the entire weight of the weigh frame is transferred to the load cell, in the manner previously described, so that the cam surface 60 of lock arm 56 does not interfere with the measurement of the weight of the load.

Supplemental to but working in conjunction with the weighing system is a releasable lockdown system for the weigh or load frame during the transport mode. A lock rod assembly generally designated by reference numeral 63 is attached to lock arm 56 by a cross pin 64 and to the upper end of a lock rod 65 by pin 66. Note that pins 64 and 66 are essentially at right angles to one another. During the weighing mode when cylinder piston 52 is fully extended lock rod 65 hangs in a plumbbob fashion from the end of lock arm 56. While changing from the weigh mode to the transport mode piston 52 of the hydraulic cylinder retracts and the load body or frame is lowered back onto spacer 14 while lock rod 65 is pulled upward by lock arm 56.

At its lower end lock rod 65 is threaded to accommodate lock nuts 66. Resting on top 20 of lock nuts 66 is a lower spring retainer or collar 69. An upper spring retainer or collar 67 is slipfit over lock rod 65. Upper spring collar 67 is dome shaped or hemispherically shaped to fit snugly into a correspondingly chamfered opening 68 formed in the traderside of bottom or lower plate 70 of stop block 71. Chamfered opening 68 is sized significantly greater than the diameter of lock rod 65 to allow lock rod 65 to swing free during the weigh mode if the truck is on a somewhat tilted grade. When lock rod assembly 63 is raised in response to the outboard end of lock arm 56 being raised as the system goes into the transport mode the hemispherically shaped upper spring collar automatically locates itself properly in the chamfered opening 68. Stop block 71 is fixedly attached, preferably by bolting, to vehicle frame 11.

While the system is changing to the transport mode cylinder piston 52 is being retracted resulting in lock arm 56 swinging upward and lock rod assembly 63 and lock rod 65 being raised. Compression spring 73 wrapped around lock rod 65 is compressed by the action of the lower spring retainer 69 being elevated and the upper spring retainer 67 being held in place by lock plate 70. When the piston is fully retracted and the lock arm 56 fully elevated the spring pressure can be adjusted by adjusting lock nuts 66. In any event, spring 73 is preferably made so that it does not have to be fully compressed to securely hold the load frame 13 firmly against the spacer 14 during transport mode and during normal operation such as when the vehicle turns and stops. This manner of attachment will allow the vehicle frame 11 to twist and bend under the load frame in its normal fashion during the transport mode and yet will hold the two frames firmly together.

When the weigh frame 13 is elevated or raised for the weighing mode it can shift or move somewhat fore or aft and have some degree of pitch and roll depending upon the grade where the vehicle is parked. After weighing and when the load frame 13 is lowered back onto the vehicle frame for transport it should be centered onto the vehicle frame. A preferred manner of insuring centering uses a tooth-type locating wedge 75 which is rigidly attached, such as by bolting, to the weigh frame and which fits into an appropriately shaped tapered socket 76 which is attached in some suitable fashion to the vehicle frame 11. The wedge 75 entering into socket 76 acts to funnel the load frame into the proper position on the vehicle frame. If necessary, shims can be used to position the wedges 75 with respect to the socket 76 so that the load frame does not shift or move around on the vehicle frame or the spacer during the transport mode.

As mentioned earlier, the upper gimbal mounting axis 19 and the cap-to-load cell mounting axis 18 intersect at an upper point and the lower gimbal mounting axis 59 intersects with the cap-to-load cell mounting axis 57 at a lower point. The distance between these two intersection points should be kept relatively short. Naturally this will depend upon the nature and the dimensions of the load cell as well as other factors. The reason for keeping this distance short is that during the weighing mode when the load frame is lifted off the vehicle frame the two intersection points will "plumb bob" or be in line with the earth's center of gravity with no part of the weigh frame or load touching any part of the vehicle frame. If the displacement between the intersecting points is too great then, depending upon the angle of tilt of the load flame when it is lifted off the vehicle frame during the weighing mode, some part of the load or load frame might contact some part of the vehicle frame thereby resulting in an inaccurate reading of the weight of the load.

As mentioned earlier, this invention is directed toward the mechanism for providing an on-board weighing system which will meet the specifications for accuracy and repeatability to qualify for the status of being "legal for trade". An essential part of the system, which is not described herein, is the electrical circuitry and instrumentation. This can be of a form which uses conventional and commercially available components to provide the power or energy and the circuitry necessary to produce the electrical signals generated by the load cells and feed them to appropriate display devices to give the desired readings and information. Also, in the usual case where a number of weighing systems are mounted on a single vehicle and the readings combined to produce the overall readout of the weight of the load, suitable circuitry must be provided to combine the electrical signals and feed them to an appropriate display device. Also, the system normally will include electrical circuitry which will prevent the system from being energized in the event the vehicle is in motion and/or if the vehicle is parked at too steep of an angle. Also, as a safety precaution, normally there are warning devices to make sure that the load frame is locked securely in place to the vehicle support frame after a weighing operation before the vehicle is allowed to move. Also, it is usual that the load cells must be calibrated prior to installation or use. Appropriate circuits and devices are commercially available and one of ordinary skill in the art should be able to incorporate into the operation of the system as described hereinabove in order to provide the necessary outputs and safety features. Suitable output devices, which can give visual as well as audible signals, are usually mounted in the cab of the vehicle.

I claim:

1. An onboard load weighing system for a vehicle having a vehicle support frame and a load frame for carrying a load, said load frame resting on said support frame when the load is being transported, comprising:

(a) load cell means for producing a signal indication in response to an applied force;

(b) means for coupling said load cell means to the vehicle support frame;

(c) means for elevating said load frame from said vehicle support frame and for coupling said load frame to said load cell for transferring the weight of said load frame to said load cell, having a double acting linear power device having a driving member and a driven member, said driving member pivotally attached to said load frame; and having means for pivotally coupling said driven member to said load cell, said means for pivotally coupling said driven member to said load cell having (i) a first elongated lever arm pivotally attached at an end to the load frame and pivotally attached to said power device driven member at a substantial distance from said first-mentioned end; (ii) an elongated weigh arm pivotally attached at an end to said load frame; (iii) means for pivotally attaching said load cell to said weigh arm; and (iv) means for contacting said weigh arm with said first elongated lever arm to apply a force to said weigh arm and to said load cell when said driven member is driven; and (d) said means for coupling the load cell to said vehicle support frame and to said load frame arranged to apply the force of the load frame weight on said load cell in line with the earth's gravity pull even if the load frame is tilted with respect to the vehicle support frame.

2. The weighing system as described in claim 1, wherein:

a) said means for coupling said load cell means to the vehicle support frame includes a first gimbal ring pivotally attached along a first axis to the vehicle support frame, a first cap member attached to a first end of said load cell, said first cap member pivotally attached to said first gimbal ring along a second axis which is normal to and intersects said first axis; and b) said means for pivotally attaching said load cell to said weigh arm includes a second gimbal ring, means for pivotally attaching said second gimbal ring to said weigh arm along a third axis, a second cap member attached to the opposite end of said load cell, said second cap member pivotally attached to said second gimbal ring along a fourth axis which is normal to and intersects said third axis.

3. The weighing system as described in claim 2 wherein said means for contacting said weigh arm with said elongated lever arm includes a lip member extending outward from said weigh arm, said elongated lever arm contacting said lip member when said driven member is extended.

4. The weighing system as described in claim 3 further including:

a) an elongated lock arm pivotally attached at one end to said load frame;

b) means for pivotally linking said first elongated lever arm to said lock arm such that an end of said lock arm is swung downward and upward as said driven member is correspondingly driven to an extended position and retracted; and c) means coupled to said lock arm for releasably locking said load frame to said vehicle frame when said lock arm is down and for unlocking the load frame from the vehicle frame when said lock arm is up.

5. The weighing system as described in claim 4 wherein said means for releasably locking said load frame comprises:

a) an elongated rod swivably attached at one end to and extending downward from the distal end of said lock arm;

b) a rigid plate member extending horizontally outward from said vehicle frame, said plate member having an opening which said rod passes through;

c) a retainer at the other end of said rod;

d) spring means located between said retainer and the underside of said plate member, said rod placing said spring means in compression to apply a holding force to said lock arm when the lock arm is swung up and said rod releasing the compression of said spring means and said holding force when the lock arm is swung down.

6. An on-board load weighing system for a vehicle having a vehicle support frame and a load frame for carrying a load, said load frame resting on said support frame when the load is being transported, comprising:

(a) a load cell for producing a signal indication of the weight of a load when in tension;

(b) a first gimbal ring pivotally attached to the vehicle support frame;

(c) means for pivotally attaching an end of said load cell to said first gimbal ring;

(d) a second gimbal ring generally parallel to said first gimbal ring;

(e) means for pivotally attaching the opposite end of said load cell to said second gimbal ring.

(f) a double acting linear power device having a fixed member and a movable member, said fixed member pivotally attached to the load frame;

(g) a first engaged lever arm pivotally attached at an end to the load frame and pivotally attached to said movable member away from said first-mentioned end;

(h) a weigh arm pivotally attached at one end of said load frame, said weigh arm including a gimbal support yoke extending upward from said weigh arm;

(i) means for pivotally attaching said second gimbal ring to said yoke;

(j) a lip member extending outward from said weigh arm;

(k) said first elongated lever arm contacting said weigh arm lip member and applying a force thereto when said movable member is moved to cause said fixed member to raise the load frame from the vehicle support frame and to transfer the weight of the load frame to said load cell to produce a signal indication of the load frame weight.

7. An on-board load weighing system for a vehicle having a vehicle support frame and a load frame for carrying a load, said load frame resting in a rest disposition on said support frame when the load is being transported, comprising:

(a) load cell means for producing a signal indication in response to an applied force;

(b) means for coupling said load cell means to the vehicle support frame;

(c) means for elevating said load frame from said vehicle support frame from the rest disposition to a weighing disposition and for coupling said load frame to said load cell for transferring the weight of said load frame to said load cell having a liftoff system for bearing the weight of the load frame during transit of said load frame from the rest disposition to the weighing disposition wherein said liftoff system includes a cammed arm having a cam surface, the cam surface bearing the weight of the load frame only during said transit of said vehicle support frame from the rest disposition to the weighing disposition.

(d) said means for coupling the load cell to said vehicle support frame and to said load frame arranged to apply the force of the load frame weight on said load cell in line with the earth's gravity pull even if the load frame is tilted with respect to the vehicle support frame.

8. The on-board load weighing system of claim 7 wherein said means for coupling the load cell to said vehicle support frame and to said load frame comprises two independent gimbal rings, each of said gimbal rings having two degrees of freedom.

9. The on-board load weighing system of claim 7 being used in cooperation with a plurality of like on-board load weighing systems on a vehicle and further including a weigh arm assembly being operably pivotally coupled to the means for elevating said load frame from said vehicle support frame, the weigh arm assembly being adjustable to affix the means for coupling said load cell means to the vehicle support frame in a plumb disposition with each of the plurality of like on-board load weighing systems on the vehicle.

10. The on-board load weighing system of claim 7 further including a lockdown system for locking the load frame to the vehicle support frame in the rest disposition, the lockdown system being biased in a locked disposition, the bias maintaining the locked disposition as the vehicle support frame twists and bends with respect to the load frame responsive to the movement of the vehicle during transport.

11. The on-board load weighing system of claim 10 having a receiver and a collar, the receiver being operably fixedly coupled to the vehicle support frame and presenting a chamfered recess, and the collar being operably coupled to the load frame and having a generally dome shape for being received within the chamfered recess of the receiver in the locked disposition.

12. The on-board load weighing system of claim 11 wherein the collar is operably coupled to a biasing member, the biasing member urging the collar into the locked disposition with the receiver.

13. The on-board load weighing system of claim 7 further including alignment means having a first portion operably coupled to the vehicle support frame and a second portion operably coupled to the load frame, the first and second portions of the alignment means cooperating to ensure that during transit of the load frame from the weighing disposition to the rest disposition, the load frame is returned to substantially the same disposition with respect the vehicle support frame from which the load frame was elevated.

14. The on-board load weighing system of claim 11 wherein the alignment means first portion is generally wedge shaped and the alignment means second portion has a generally tapered socket defined therein for cooperative engagement with the generally wedge shaped first portion.

* * * * *